United States Patent [19]

Kagata et al.

[11] Patent Number: 5,525,562
[45] Date of Patent: Jun. 11, 1996

[54] DIELECTRIC CERAMIC COMPOUND

[75] Inventors: Hiroshi Kagata, Neyagawa; Junichi Kato, Osaka; Keiji Nishimoto, Takatsuki, all of Japan

[73] Assignee: Matsushita Electric Industrial Co., Ltd., Osaka, Japan

[21] Appl. No.: 363,901

[22] Filed: Dec. 27, 1994

[30] Foreign Application Priority Data

Jan. 25, 1994 [JP] Japan .................... 6-006087
Jan. 25, 1994 [JP] Japan .................... 6-006090
Jun. 2, 1994 [JP] Japan .................... 6-121441

[51] Int. Cl.$^6$ ................................. C04B 35/46
[52] U.S. Cl. .......................... 501/135; 501/136
[58] Field of Search ........................ 501/135, 136

[56]  References Cited

U.S. PATENT DOCUMENTS

| | | | |
|---|---|---|---|
| 4,242,213 | 12/1980 | Tamura et al. | 501/136 |
| 4,265,668 | 5/1981 | Fujiwara et al. | 501/136 |
| 4,339,544 | 7/1982 | Sakabe et al. | 501/136 |
| 4,536,821 | 8/1985 | Wheeler et al. | 501/136 |
| 5,057,466 | 10/1991 | Sugiyama et al. | 501/135 |
| 5,147,835 | 9/1992 | Franzak et al. | 501/135 |
| 5,340,784 | 8/1994 | Katoh et al. | 501/136 |

FOREIGN PATENT DOCUMENTS 0384465 8/1990 European Pat. Off. .
0582274A1 2/1994 European Pat. Off. .

*Primary Examiner*—Deborah Jones
*Attorney, Agent, or Firm*—Fish & Richardson

[57]  ABSTRACT

This invention provides a dielectric ceramic compound for microwave use which has a high dielectric constant and a high Q value, and which also has a small temperature coefficient of a resonant frequency. The dielectric ceramic compound comprising a compound represented by Formula 1 at least includes calcium oxide, magnesium oxide, zinc oxide, niobium oxide, tantalum oxide, and titanium oxide, (Formula 1)

$$Ca[\{(Mg_{1-x}Zn_x)_{1/3}(Nb_{1-z}Ta_z)_{2/3}\}_{1-y}Ti_y]O_3$$

wherein x and y are present within an area formed by the following apexes A, B, C, and D, excluding an area on straight line AB, A: (x, y)=(0.0, 0.0)
B: (x, y)=(0.0, 0.5)
C: (x, y)=(1.0, 0.55)
D: (x, y)=(1.0, 0.0)
and z is present in the range of $0.0 \leq z \leq 1.0$, excluding z=1.0 when y=0.0.

8 Claims, 3 Drawing Sheets

DIELECTRIC CERAMIC COMPOUND

FIELD OF INVENTION

This invention relates to a dielectric ceramic compound for microwave use.

BACKGROUND OF THE INVENTION

Recently, along with the advancement of communication in electromagnetic waves in the frequency region of microwaves, for example, in automobile telephones, in portable telephones, or in satellite braodcasts, apparatuses are required to be smaller. In order to attain this goal, each component comprising the apparatus must be miniaturized. In these apparatuses, a dielectric is inserted in a filter element or in an oscillation element in the form of a dielectric resonator. When using the same resonant mode, the size of the dielectric resonator is inversely proportional to the square root of the dielectric constant ($\epsilon_r$) attributed to the dielectric material. Therefore, a material having a high dielectric constant is needed to manufacture a compact-sized dielectric resonator. In addition, in order to put a dielectric resonator into practice, the dielectric resonator must have low loss in the microwave region. In other words, the dielectric resonator must have a high Q value and a low temperature coefficient ($\tau_f$) of a resonant frequency.

As a microwave dielectric used for a conventional dielectric resonator, a number of perovskite type ceramic compounds are disclosed, for example, in Published Examined Japanese Patent Application No. (Tokko Sho) 59-48484. These ceramic compounds contain Ba in A-site such as $Ba(Zn_{1/3}Ta_{2/3})O_3$ type. These dielectrics have high Q values.

However, the above-mentioned dielectric ceramic compounds have the problem that the dielectric constants are as low as about 30 which is hardly practical for producing compact-sized dielectric resonators. Therefore, in order to reduce the size of the dielectric resonator, a dielectric having a higher dielectric constant, a high Q value, and a small temperature coefficient of resonant frequency has been in great demand.

SUMMARY OF THE INVENTION

It is an object of this invention to solve the above-noted problems by providing a dielectric ceramic compound for microwave use which has a high dielectric constant and a high Q value, and which also satisfies the requirement of a small temperature coefficient of a resonant frequency.

In order to accomplish these and other objects and advantages, a first dielectric ceramic compound of this invention shown in Formula 1 comprises calcium oxide, magnesium oxide, niobium oxide, tantalum oxide, and titanium oxide, (Formula 1)

$$Ca[\{Mg_{1/3}(Nb_{1-x}Ta_x)_{2/3}\}_{1-y}Ti_y]O_3$$

wherein x and y are present in the range of $0.0 \leq x \leq 1.0$ and $0.0 \leq y \leq 0.5$ except for where (x, y)=1.0, 0.0.

A second dielectric ceramic compound of this invention shown in Formula 2 comprises calcium oxide, magnesium oxide, zinc oxide, niobium oxide, tantalum oxide, and titanium oxide, (Formula 2)

$$Ca[\{(Mg_{1-x}Zn_x)_{1/3}(Nb_{1-z}Ta_z)_{2/3}\}_{1-y}Ti_y]O_3$$

wherein x and y are present within an area formed by the following apexes A, B, C, and D, excluding an area on straight line AB, A: (x, y)=(0.0, 0.0)
B: (x, y)=(0.0, 0.5)
C: (x, y)=(1.0, 0.55)
D: (x, y)=(1.0, 0.0)

and z is present in the range of $0.0 \leq z \leq 1.0$, excluding z=1.0 when y=0.0.

A third dielectric ceramin compound of this invention shown in Formula 3 comprises calcium oxide, strontium oxide, magnesium oxide, niobium oxide, tantalum oxide, and titanium oxide, (Formula 3)

$$(Ca_{1-x}Sr_x)[\{Mg_{1/3}(Nb_{1-z}Ta_z)_{2/3}\}_{1-y}Ti_y]O_3$$

wherein x and y are present within an area formed by apexes A, B, C, D, and E, excluding an area on straight lines AB and AE, A: (x, y) =(0.0, 0.0)
B: (x, y)=(0.0, 0.5)
C: (x, y)=(0.4, 0.5)
D: (x, y)=(1.0, 0.2)
E: (x, y)=(1.0, 0.0)

and z is present in the range of $0.0 \leq z \leq 1.0$.

A fourth dielectric ceramic compound of this invention shown in Formula 4 comprises calcium oxide, zinc oxide, magnesium oxide, niobium oxide, tantalum oxide, and titanium oxide, (Formula 4)

$$(Ca_{1-x}Pb_x)[\{Mg_{1/3}(Nb_{1-z}Ta_z)_{2/3}\}_{1-y}Ti_y]O_3$$

wherein x and y are present within within an area formed by apexes A, B, C, and D, excluding an area on straight lines AB and CD, A: (x, y)=(0.0, 0.0)
B: (x, y)=(0.0, 0.5)
C: (x, y)=(0.125, 0.5)
D: (x, y)=(0.25, 0.0)

and z is present in the range of $0.0 \leq z \leq 1.0$, excluding z=1.0 when y=0.0.

The first dielectric ceramic compound at least comprises calcium oxide, magnesium oxide, niobium oxide, tantalum oxide, and titanium oxide, and is shown in Formula 1 described above. Accordingly, the compound has a high dielectric constant and a high Q value, and also has a small temperature coefficient of a resonant frequency.

The second dielectric ceramic compound at least comprises calcium oxide, magnesium oxide, zinc oxide, niobium oxide, tantalum oxide, titanium oxide, and is shown in Formula 2 described above. Accordingly, the compound also has a high dielectric constant and a high Q value, and satisfies the need for a small temperature coefficient of a resonant frequency.

The third dielectric ceramic compound at least comprises calcium oxide, strontium oxide, magnesium oxide, niobium oxide, tantalum oxide, and titanium oxide, and is shown in Formula 3 described above. Accordingly, the compound also has a high dielectric constant and a high Q value, and, in addition, has a small temperature coefficient of a resonant frequency.

The fourth dielectric ceramic compound at least comprises calcium oxide, zinc oxide, magnesium oxide, niobium oxide, tantalum oxide, and titanium oxide, and is shown in Formula 4 described above. Accordingly, the compound has a high dielectric constant and a high Q value, and also has a small temperature coefficient of a resonant frequency.

It is preferable in the first to the fourth dielectric ceramic compounds of this invention that a dielectric constant is 20 or higher, a temperature coefficient of resonant frequency is −65 ppm/°C. or higher and +50 ppm/°C. or lower, and a product of a Q value and a resonant frequency is 15000 GHz or higher.

It is preferable in the first to the fourth dielectric ceramic compounds of this invention that a part of Nb is substituted by Ta to improve the Q value, and when the dielectric constant is 40 or higher, the temperature coefficient of the resonant frequency can be almost 0 ppm/°C. As a result, the dielectric resonators can have a compact size and high performance.

DETAILED DESCRIPTION OF THE INVENTION

This invention will be described by referring to the following illustrative examples and attached figures. The examples are not intended to limit the invention in any way.

Example 1

Starting raw materials used were chemically high purity $CaCO_3$, $SrCO_3$, PbO, MgO, ZnO, $Nb_2O_5$, $Ta_2O_5$, and $TiO_2$. After the raw materials were purified, x and y of the above-mentioned formula (Formula 1) were measured, and the amounts varied as illustrated in Table 1. In the same manner, x, y, and z of the above-mentioned formulas (Formula 2), (Formula 3), and (Formula 4) were also measured, and the amounts varied as illustrated in Tables 2, 3, and 4.

Figure 1:
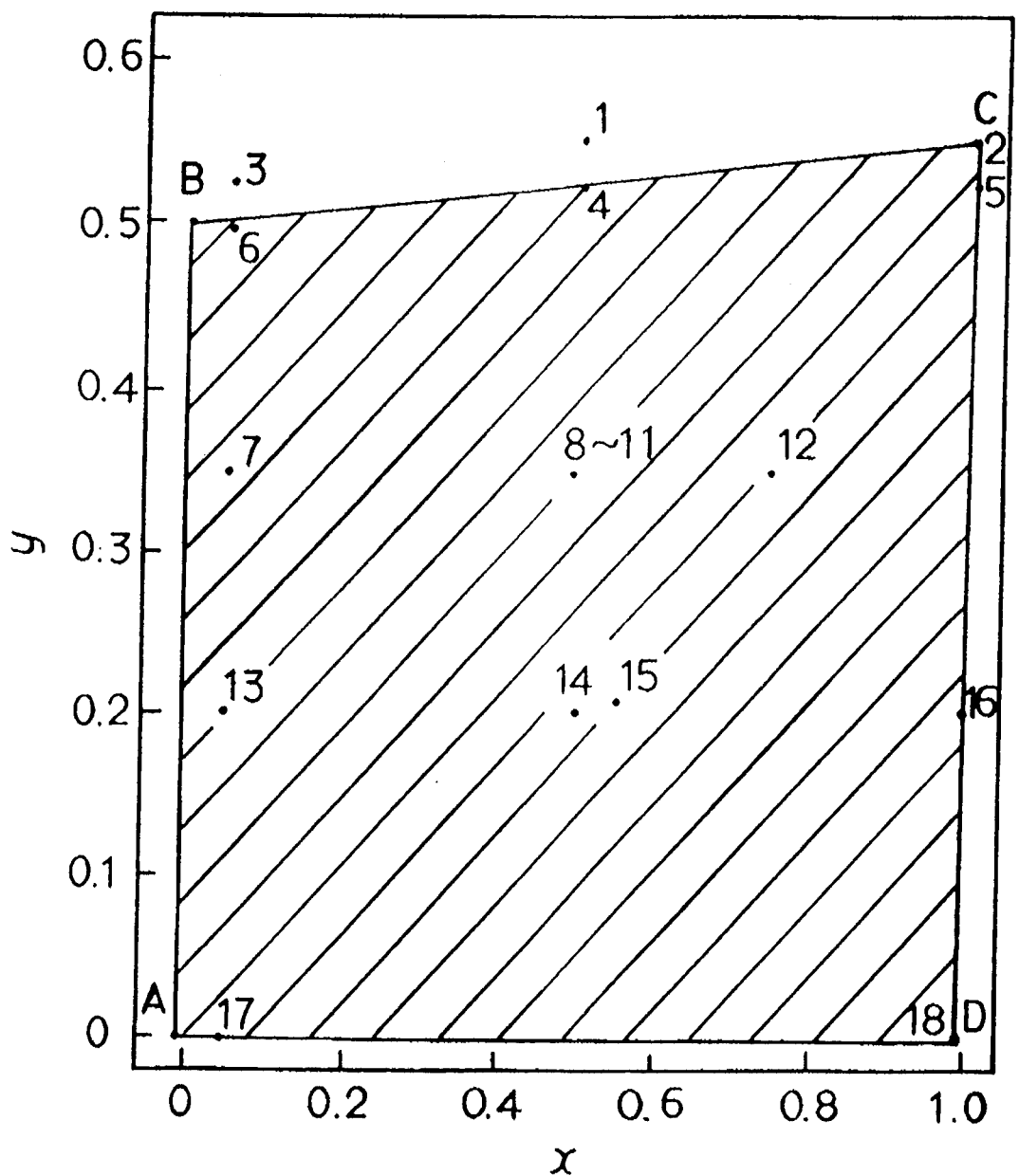
FIG. 1 is a diagram showing the composition of the second dielectric ceramic compound of this invention.
Figure 2:
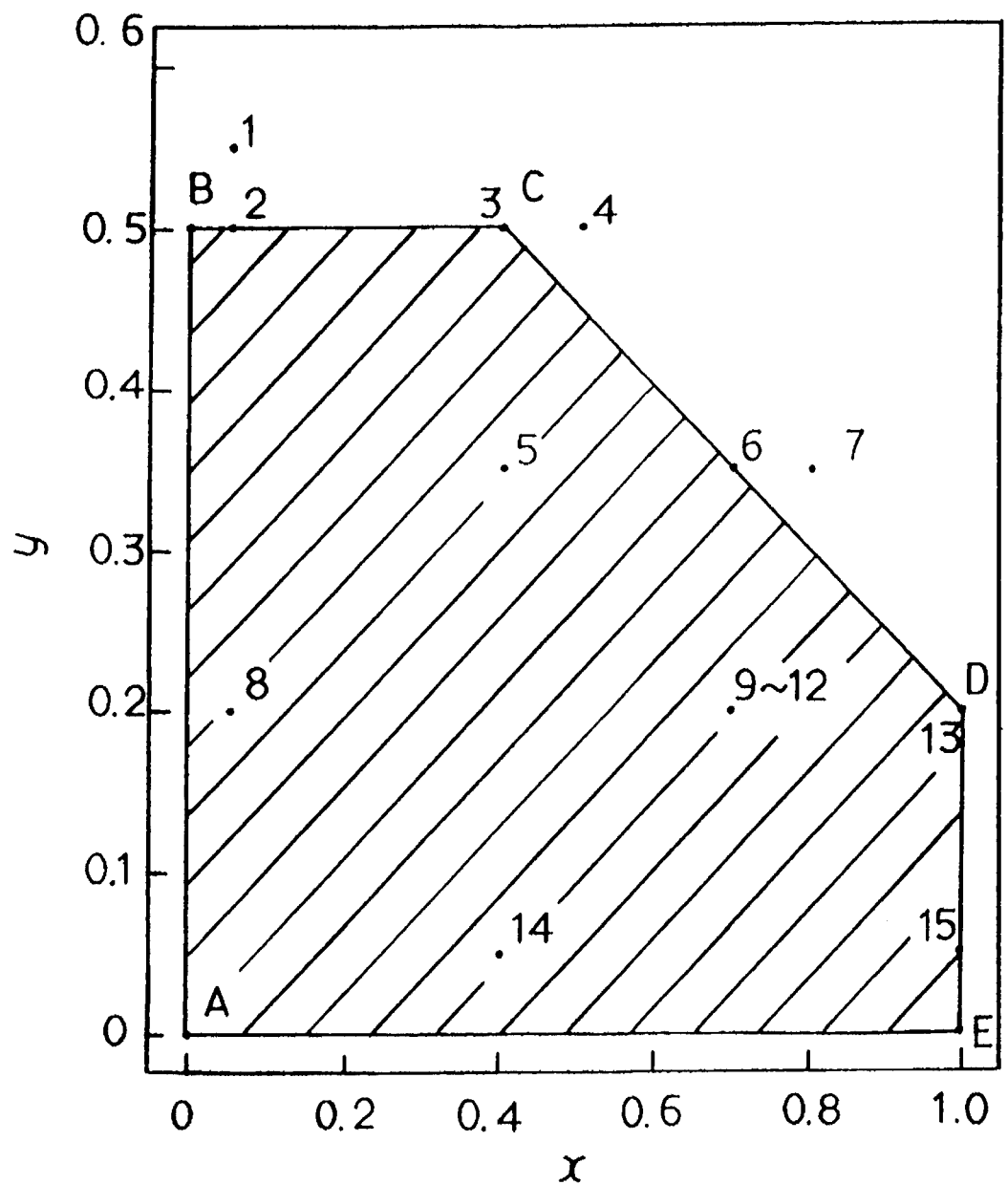
FIG. 2 is a diagram showing the composition of the third dielectric ceramic compound of this invention
Figure 3:
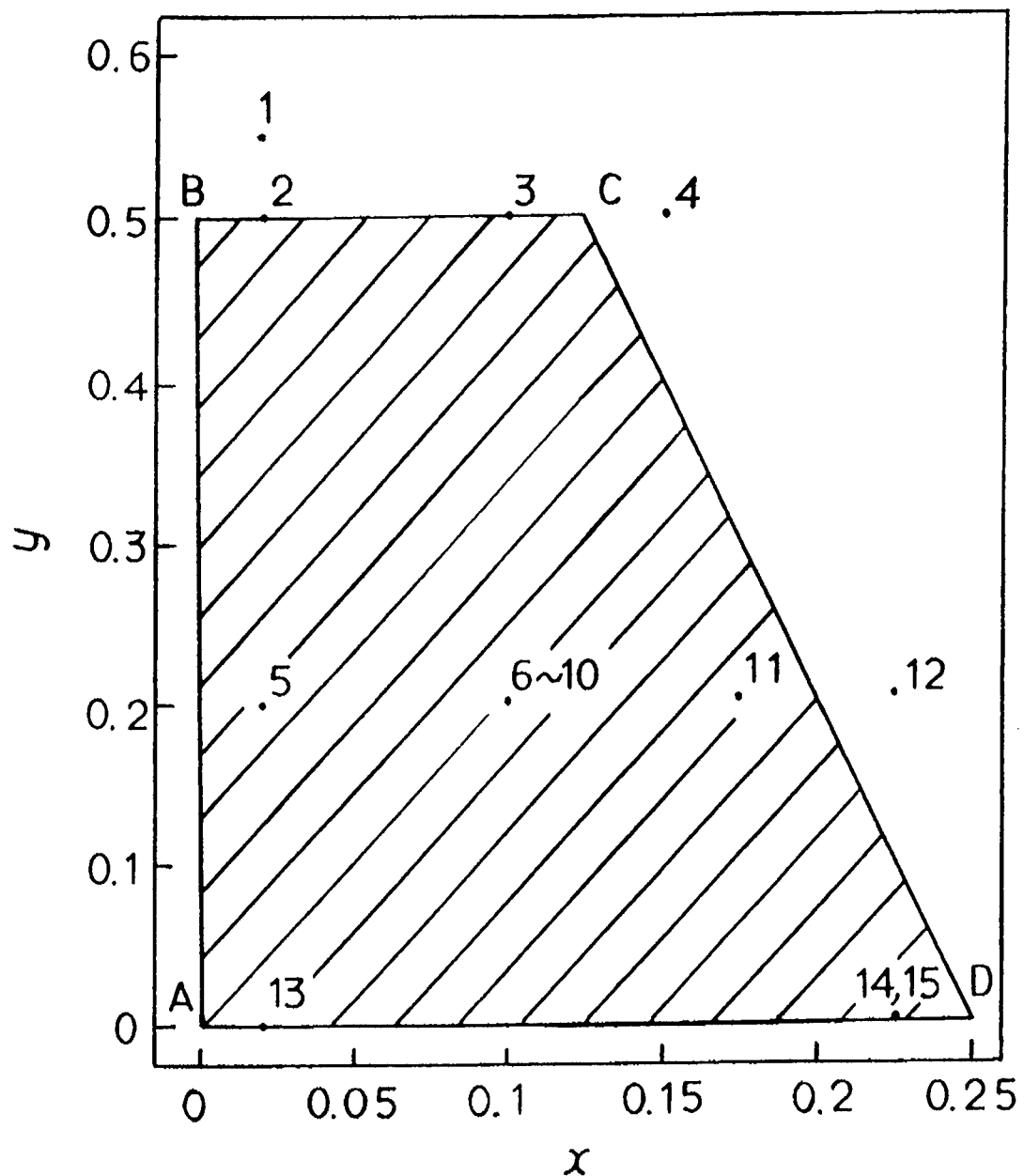
FIG. 3 is a diagram showing the composition of the fourth dielectric ceramic compound of this invention.

FIG. 1, 2, and 3 show compositions corresponding to Tables 2, 3, and 4 respectively and illustrate measurement points on the xy-plane. Reference numerals in the figures correspond to numbers in the tables.

A powder of the above-mentioned starting raw materials was put into a polyethylene ball mill, a stabilized zirconia ball of 5 mm in diameter and demineralized water were added and mixed for 17 hours. After mixing, the slurry was dried, put into an alumina crucible, and calcined at a temperature of from 900 to 1100° C. for 4 hours. After the calcined body was crushed by a grinding machine, it was pulverized in the above-mentioned ball mill for 17 hours, dried and made into a raw material powder. Next, after adding 6 weight percent of 5 weight percent aqueous solution made of polyvinyl alcohol into this powder as a binder, it was mixed, granulated through a 32 mesh screen, and press-molded with 100 MPa into a cylindrical shape of 13 mm in diameter and about 5 mm in thickness. The pressed body was heated at a temperature of 650° C. for 2 hours, and when the binder was burnt, the pressed body was put into a magnesia vessel, lidded and fired at various temperatures of from 1100° to 1500° C. for 2 hours. A sintered body, which was burned at a temperature at which the density reached the highest value, was measured with respect to dielectric properties in the microwave region.

Dielectric constants and Q values were measured by Hakki's method reported in IRE Trans. Microwave Theory Tech. MTT-8 (1960) 402. The resonant frequency was from 2 to 5 GHz. Furthermore, resonant frequencies at −25° C., 20° C., and 85° C. were measured, and the temperature coefficients of resonant frequencies ($\tau_f$) were calculated by the values of −25 C. and +85° C. The results are shown in Tables 1, 2, 3, and 4. Tables 1, 2, 3, and 4 correspond respectively to the first, the second, the third, and the fourth embodiments of the invention. In Tables 1 to 4, the numbers followed by a # show comparative examples.

TABLE 1

| No. | Composition | | $\xi r$ | Qf product GHz | $\tau_f$ ppm/°C. |
|---|---|---|---|---|---|
| | x | y | | | |
| 1 | 0.0 | 0.0 | 28 | 65000 | −48 |
| 2 | 0.0 | 0.5 | 24 | 73000 | −54 |
| 3 | 0.0 | 0.97 | 22 | 81000 | −60 |
| 4 | 0.3 | 0.0 | 42 | 34000 | −12 |
| 5 | 0.3 | 0.2 | 41 | 36000 | −14 |
| 6 | 0.3 | 0.5 | 39 | 39000 | −19 |
| 7 | 0.35 | 0.0 | 45 | 31000 | 0 |
| 8 | 0.35 | 0.2 | 44 | 34000 | −2 |
| 9 | 0.4 | 0.0 | 49 | 30000 | +13 |
| 10 | 0.4 | 0.2 | 46 | 33000 | +10 |
| 11 | 0.4 | 1.0 | 40 | 38000 | +1 |
| 12 | 0.5 | 0.5 | 53 | 27000 | +47 |
| 13# | 0.55 | 0.0 | 61 | 17000 | +85 |
| 14# | 0.55 | 0.2 | 54 | 19000 | +79 |
| 15# | 0.55 | 1.0 | 50 | 22000 | +70 |

TABLE 2

| No. | Composition | | | $\xi r$ | Qf product GHz | $\tau_f$ ppm/°C. |
|---|---|---|---|---|---|---|
| | x | y | z | | | |
| 1# | 0.5 | 0.55 | 0.2 | 64 | 14000 | +59 |
| 2 | 1.0 | 0.55 | 0.2 | 67 | 19000 | +48 |
| 3# | 0.05 | 0.525 | 0.2 | 58 | 21000 | +56 |
| 4 | 0.5 | 0.525 | 0.2 | 60 | 19000 | +47 |
| 5 | 1.0 | 0.525 | 0.5 | 62 | 22000 | +30 |
| 6 | 0.05 | 0.5 | 0.2 | 55 | 23000 | +45 |
| 7 | 0.05 | 0.35 | 0.2 | 43 | 33000 | −4 |
| 8 | 0.5 | 0.35 | 0.0 | 47 | 27000 | −2 |
| 9 | 0.5 | 0.35 | 0.2 | 45 | 29000 | −4 |
| 10 | 0.5 | 0.35 | 0.5 | 43 | 31000 | −7 |
| 11 | 0.5 | 0.35 | 1.0 | 41 | 34000 | −11 |
| 12 | 0.75 | 0.35 | 0.2 | 48 | 16000 | −23 |
| 13 | 0.05 | 0.2 | 0.5 | 32 | 44000 | −31 |
| 14 | 0.5 | 0.2 | 0.0 | 39 | 34000 | −28 |
| 15 | 0.5 | 0.2 | 0.5 | 36 | 38000 | −34 |
| 16 | 1.0 | 0.2 | 0.2 | 41 | 23000 | −33 |
| 17 | 0.05 | 0.0 | 0.2 | 27 | 57000 | −50 |
| 18 | 1.0 | 0.0 | 0.5 | 32 | 19000 | −36 |

TABLE 3

| No. | Composition | | | $\xi r$ | Qf product GHz | $\tau_f$ ppm/°C. |
|---|---|---|---|---|---|---|
| | x | y | z | | | |
| 1# | 0.05 | 0.55 | 0.2 | 58 | 19000 | +71 |
| 2 | 0.05 | 0.5 | 0.2 | 53 | 26000 | +46 |
| 3 | 0.4 | 0.5 | 0.5 | 52 | 20000 | +47 |
| 4# | 0.5 | 0.5 | 0.2 | 59 | 13000 | +65 |
| 5 | 0.4 | 0.35 | 0.2 | 58 | 20000 | +3 |
| 6 | 0.7 | 0.35 | 0.05 | 58 | 17000 | +46 |
| 7 | 0.8 | 0.35 | 0.2 | 60 | 12000 | +68 |
| 8 | 0.05 | 0.2 | 0.2 | 34 | 44000 | −29 |
| 9 | 0.7 | 0.2 | 0.0 | 46 | 18000 | −8 |
| 10 | 0.7 | 0.2 | 0.05 | 45 | 21000 | −10 |
| 11 | 0.7 | 0.2 | 0.5 | 40 | 27000 | −14 |

TABLE 3-continued

| No. | Composition | | | $\xi r$ | Qf product GHz | $\tau_f$ ppm/°C |
|---|---|---|---|---|---|---|
| | x | y | z | | | |
| 12 | 0.7 | 0.2 | 1.0 | 34 | 30000 | -17 |
| 13 | 1.0 | 0.2 | 0.2 | 57 | 19000 | +48 |
| 14 | 0.4 | 0.05 | 0.5 | 28 | 44000 | -42 |
| 15 | 1.0 | 0.05 | 0.2 | 39 | 23000 | +2 |

TABLE 4

| No. | Composition | | | $\xi r$ | Qf product GHz | $\tau_f$ ppm/°C |
|---|---|---|---|---|---|---|
| | x | y | z | | | |
| 1# | 0.02 | 0.55 | 0.2 | 58 | 27000 | +71 |
| 2 | 0.02 | 0.5 | 0.2 | 54 | 29000 | +40 |
| 3 | 0.1 | 0.5 | 0.2 | 60 | 21000 | +42 |
| 4# | 0.15 | 0.5 | 0.2 | 65 | 15000 | +52 |
| 5 | 0.02 | 0.2 | 0.5 | 32 | 48000 | -29 |
| 6 | 0.1 | 0.2 | 0.0 | 41 | 23000 | -24 |
| 7 | 0.1 | 0.2 | 0.05 | 40 | 25000 | -26 |
| 8 | 0.1 | 0.2 | 0.2 | 39 | 26000 | -28 |
| 9 | 0.1 | 0.2 | 0.7 | 33 | 29000 | -30 |
| 10 | 0.1 | 0.2 | 1.0 | 29 | 34000 | -32 |
| 11 | 0.175 | 0.2 | 0.2 | 47 | 22000 | -22 |
| 12 | 0.225 | 0.2 | 0.2 | 50 | 14000 | -19 |
| 13 | 0.02 | 0.0 | 0.2 | 27 | 60000 | -49 |
| 14 | 0.225 | 0.0 | 0.2 | 41 | 18000 | -33 |
| 15 | 0.225 | 0.0 | 0.5 | 38 | 19000 | -35 |

As shown in Tables 1 to 4, as long as x, y, and z are within the definition provided with Formula 1 to Formula 4 mentioned above, by selecting suitable amounts of x, y, and z, it was confirmed that a compound can be obtained in which the dielectric constant is 20 or higher, the temperature coefficient of resonant frequency is -65 ppm/°C. or higher and +50 ppm/°C. or lower, and the Qf product, that is a product of a Q value and a resonant frequency, is 15000 GHz or higher. Furthermore, it was confirmed that a realm with excellent properties is present in a compound in which the dielectric constant is 40 or higher, $\tau_f$ is 0, and the Qf product is 20000 GHz or higher. In addition, by substituting Nb for Ta, it was confirmed that Q value can be improved without deteriorating the dielectric constant or $\tau_f$ significantly. On the other hand, with respect to compounds which were beyond the limits of Formula 1 to Formula 4 mentioned above, they were considered unpractical since either $\tau_f$ becomes larger than 50 ppm/°C. or the Qf products were lower than 15000 GHz.

In addition, it is also possible to include atoms other than those shown in Formula 1 to Formula 4, in particular, Ba, Cr, Fe, Co, Ni, Cu, Si, Al, Bi, Ge, Sb, and oxides comprising e.g. rare earth elements, as long as they do not negatively affect dielectric properties.

As clearly described in the above-mentioned embodiments, a dielectric ceramic compound of this invention can attain a high Q value and a small $\tau_f$ even if the dielectric constant is as high as 40 or more, thereby enabling manufacturing of a small-sized dielectric resonator. In addition, dielectric ceramics of this invention can be used not only for a dielectric resonator, but also for a high-frequency circuit substrate, a ceramic laminated capacitor etc. so that its industrial utility is high.

As described above, the first to the fourth dielectric ceramic compounds of this invention have a high dielectric constant and a high Q value, and also satisfy the need for a small temperature coefficient of a resonant frequency.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A dielectric ceramic compound comprising a compound represented by Formula 1, (Formula 1)

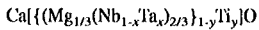

$$Ca[\{(Mg_{1/3}(Nb_{1-x}Ta_x)_{2/3})\}_{1-y}Ti_y]O$$

wherein x and y are present in the range of $0.0 \leq x \leq 1.0$ and $0.0 \leq y \leq 0.5$ except for where $(x, y) = 1.0, 0.0$.

2. The dielectric ceramic compound as in claim 1, having a dielectric constant of 20 or higher, a temperature coefficient of resonant frequency of -65 ppm/°C. or higher and +50 ppm/°C. or lower, and a product of a Q value and a resonant frequency which is 15000 GHz or higher.

3. A dielectric ceramic compound comprising a compound represented by Formula 2, (Formula 2)

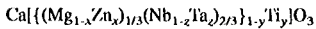

$$Ca[\{(Mg_{1-x}Zn_x)_{1/3}(Nb_{1-z}Ta_z)_{2/3}\}_{1-y}Ti_y]O_3$$

wherein x and y are present within an area formed by the following apexes A, B, C, and D, excluding an area on straight line AB, A: (x, y) = (0.0, 0.0)
B: (x, y) = (0.0, 0.5)
C: (x, y) = (1.0, 0.55)
D: (x, y) = (1.0, 0.0)

and z is present in the range of $0.0 \leq z \leq 1.0$, excluding $z = 1.0$ when $y = 0.0$.

4. The dielectric ceramic compound as in claim 3, having a dielectric constant of 20 or higher, a temperature coefficient of resonant frequency of -65 ppm/°C. or higher and +50 ppm/°C. or lower, and a product of a Q value and a resonant frequency which is 15000 GHz or higher.

5. A dielectric ceramic compound comprising a compound represented by Formula 3, (Formula 3)

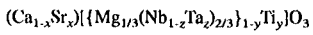

$$(Ca_{1-x}Sr_x)[\{Mg_{1/3}(Nb_{1-z}Ta_z)_{2/3}\}_{1-y}Ti_y]O_3$$

wherein x and y are present within an area formed by apexes A, B, C, D, and E, excluding an area on straight lines AB and AE, A: (x, y) = (0.0, 0.0)
B: (x, y) = (0.0, 0.5)
C: (x, y) = (0.4, 0.5)
D: (x, y) = (1.0, 0.2)
E: (x, y) = (1.0, 0.0)

and z is present in the range of $0.0 \leq z \leq 1.0$.

6. The dielectric ceramic compound as in claim 5, having a dielectric constant of 20 or higher, a temperature coefficient of resonant frequency of -65 ppm/°C. or higher and +50 ppm/°C. or lower, and a product of a Q value and a resonant frequency which is 15000 GHz or higher.

7. A dielectric ceramic compound comprising a compound represented by Formula 4, (Formula 4)

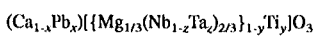

$$(Ca_{1-x}Pb_x)[\{Mg_{1/3}(Nb_{1-z}Ta_z)_{2/3}\}_{1-y}Ti_y]O_3$$

wherein x and y are present within within an area formed by apexes A, B, C, and D, excluding an area on straight lines AB and CD,
- A: (x, y)=(0.0, 0.0)
- B: (x, y)=(0.0, 0.5)
- C: (x, y)=(0.125, 0.5)
- D: (x, y)=(0.25, 0.0)

and z is present in the range of $0.0 \leq z \leq 1.0$, excluding z=1.0 when y=0.0.

8. The dielectric ceramic compound as in claim 7, having a dielectric constant of 20 or higher, a temperature coefficient of resonant frequency of −65 ppm/°C. or higher and +50 ppm/°C. or lower, and a product of a Q value and a resonant frequency which is 15000 GHz or higher.

* * * * *